United States Patent [19]

Hayashi et al.

[11] Patent Number: 5,004,586
[45] Date of Patent: Apr. 2, 1991

[54] GAS GENERATING APPARATUS FOR INFLATING AIR BAG

[75] Inventors: Minoru Hayashi; Koichi Kobari; Kimiharu Sato; Kishimoto Junichi, all of Fukushima, Japan

[73] Assignee: Nippon Koki Co., Ltd., Tokyo, Japan

[21] Appl. No.: 150,029

[22] Filed: Jan. 29, 1988

[30] Foreign Application Priority Data

Feb. 10, 1987 [JP] Japan .................. 62-29339

[51] Int. Cl.⁵ .............................................. B60R 21/30
[52] U.S. Cl. ...................................... 422/164; 102/530; 102/531; 280/736; 280/738; 280/741; 422/165; 422/167; 422/305
[58] Field of Search ............. 422/305, 164, 166, 239, 422/167; 280/731, 736, 737, 738, 741, 742, 732, 728; 102/530, 531

[56] References Cited

U.S. PATENT DOCUMENTS

| 3,163,014 | 12/1964 | Wismar | 422/305 |
| 3,180,373 | 4/1965 | Hebenstreit | 422/305 |
| 3,787,074 | 1/1974 | Lewis et al. | 422/165 |
| 3,797,854 | 3/1974 | Poole et al. | 422/164 |
| 3,877,882 | 4/1975 | Lette et al. | 422/164 |
| 3,898,048 | 8/1975 | Barber et al. | 422/164 |
| 3,909,037 | 9/1975 | Stewart | 280/738 |
| 3,912,458 | 10/1975 | Fukuma et al. | 422/164 |
| 4,021,275 | 3/1977 | Kishi et al. | 422/164 |
| 4,305,908 | 12/1981 | Anisimov et al. | 422/164 |
| 4,578,247 | 3/1986 | Bolieau | 422/165 |
| 4,590,041 | 5/1986 | Hill | 422/165 |
| 4,833,996 | 5/1989 | Hayashi et al. | 280/738 |

FOREIGN PATENT DOCUMENTS

| 57-45612 | 9/1982 | Japan | 422/305 |
| 57-54169 | 11/1982 | Japan | 422/305 |

Primary Examiner—Peter Kratz
Attorney, Agent, or Firm—Kalish & Gilster

[57] ABSTRACT

A gas generating apparatus for inflating an air bag which comprises a housing with an open joint portion connecting to the air bag and having a combustion chamber formed at the center inside the housing body wherein a high pressure gas is generated upon combustion of a gas generating agent. A partition is provided which defines a mixing chamber in a ring-like configuration by being concentrically disposed so as to be spaced apart from the opening of the housing body by a pre-selected interval whereby the high pressure gas forming a combustion chamber is introduced into the mixing chamber. A nozzle formed in a ring-like configuration is provided at the high pressure gas introducing portion so that the high pressure gas is ejected toward the opening of the mixing chamber and an air intake portion is formed along the nozzle on the housing body.

15 Claims, 2 Drawing Sheets

GAS GENERATING APPARATUS FOR INFLATING AIR BAG

BACKGROUND OF THE INVENTION

1. Field of the Invention

This invention relates to a gas generating apparatus used for inflating an air bag such as one used for a safety apparatus for protection against collison, life bag, rubber boat, escape chute, etc. More particularly, this invention concerns a gas generating apparatus for inflating an air bag whereby any shortfall in the quantity of gas required for inflating the air bag can be overcome by replenishing the air bag with air.

2. Statement of the Prior Art

Conventionally, in a passenger car, a safety apparatus adapted to protect passengers against physical shock at the time of a collision comprises an air bag with a volume of 60 liters and a gas generating apparatus which inflates this air bag, the gas generating apparatus being filled either with an explosiver or a gas generating agent comprising similar constituents which is ignited and burnt at the time or a collision so as to immediately inflate the air bag with a gas generated thereby, thus protecting the driver from the effects of the collision, and preventing him from being seriously injured.

In such an apparatus, the quantity of gas generating agent required for inflating the air bag is between 70 and 100 g, and the total weight of the body of the gas generator is between 600 and 1100 g. With the above apparatus, the air bag is inflated merely by the generation of gas upon combustion of the gas generating agent; therefore, even an air bag with a 60-liter volume uses from 70 to 100 g of the generated gas, which is a relatively large amount for the gas inflation and, consequently, the volume of the combustion chamber in the body of the gas generator has to be increased to raise the gas temperature and the temperature inside the gas generating unit by combustion of a relatively large amount of gas generating agent since the volume of the combustion chamber in the gas generating unit also has to be increased, it is relatively large and heavy, and this involves such hazards as the possibility of passengers being burnt.

If the gas generating apparatus is reduced in size and weight with a corresponding reduction in the quantity of gas generating agent used therein, the air bag is not inflated to a sufficient extent and its function as a safety apparatus in time of collision is thereby compromised. Therefore, the shortfall in the quantity of gas generated needs to be overcome by supplementing the gas or the like.

For this purpose it is conceivable to incorporate in the gas generating apparatus an air ejector for replenishing air by ejecting a high-pressure gas or a vapor ejector. However, since the primary high pressure gas in these kind of ejector has a pressure as low as 10 kg/cm$^2$ or less, such an ejector also needs to be relatively increased large in size to be effective when used with such an air bag in a safety apparatus of the type described in order that a sufficient amount of air can be sucked in some tens of milliseconds.

Accordingly, such a gas generating apparatus is inevitably increased in size and weight and this means that it remains impossible for this type of bag to be used as an air bag for an automobile.

SUMMARY OF THE INVENTION

The present invention aims to solve such problems as those described above, and an object of the present invention is to provide a small, lightweight and safe gas generating apparatus for inflating an air bag wherein the quantity of gas generating agent used for inflating the air bag is reduced without resulting in any attendant disadvantages.

In the present invention, the high-pressure gas is generated when the gas generating agent in a combustion chamber is combusted, and this high-pressure gas is ejected in the direction of an opening from an annular nozzle into a mixing chamber, so that air is sucked from air intakes into the mixing chamber by virture of the ejector effect. This sucked air is mixed with and cools the gas and flows into the air bag to inflate the same.

Thus since the nozzle and air intakes are formed on the outer periphery of the housing body, a large quantity of outside air can be sucked positively owing to the ejector effect obtained by the ejecting gas,. Consequently, it is possible to decrease the quantity of gas generating agent used and to reduce the size and weight of the gas generating apparatus in proportion to the decrease in volume of the combustion chamber.

DESCRIPTION OF THE PREFERRED EMBODIMENT

Figure 1:
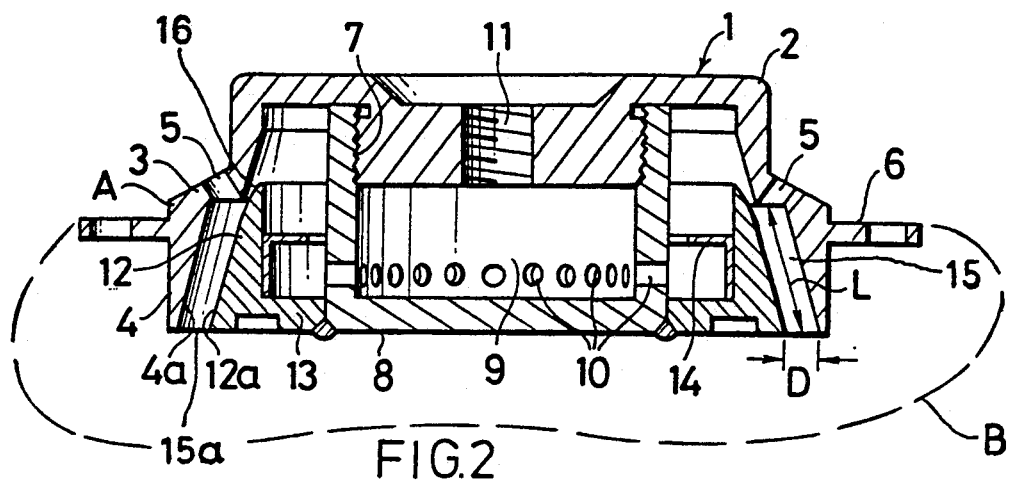
FIG. 1 is a vertical sectional view of an embodiment of the gas generating apparatus for inflating an air bag according to the present invention.
Figure 2:
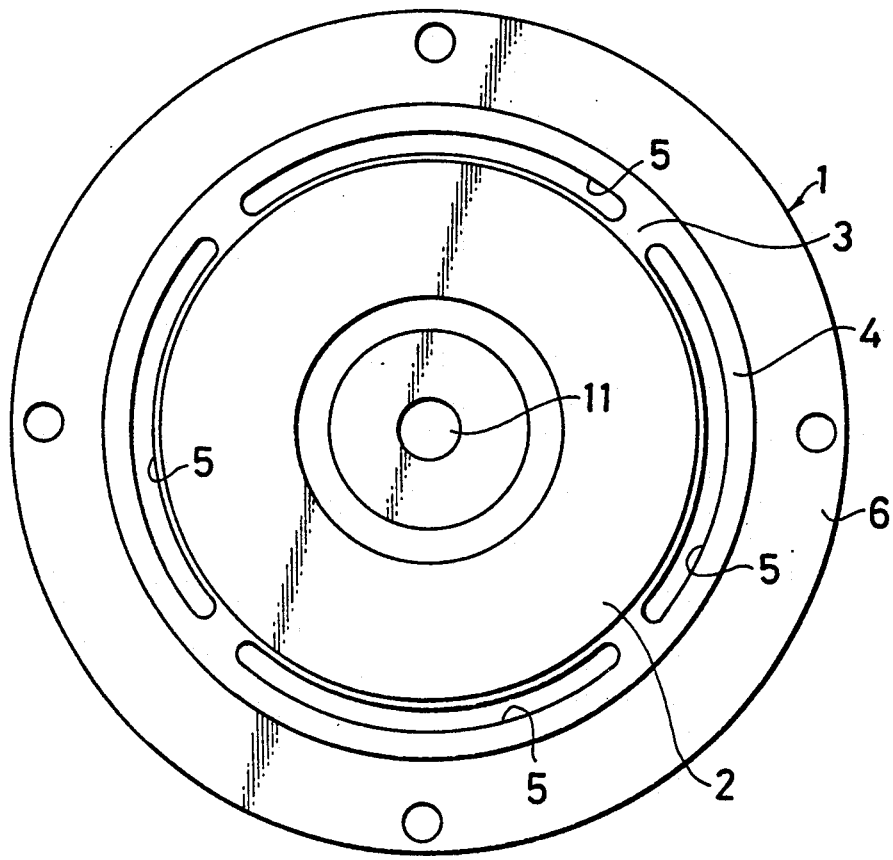
FIG. 2 is a top plan view thereof.
Figure 3:
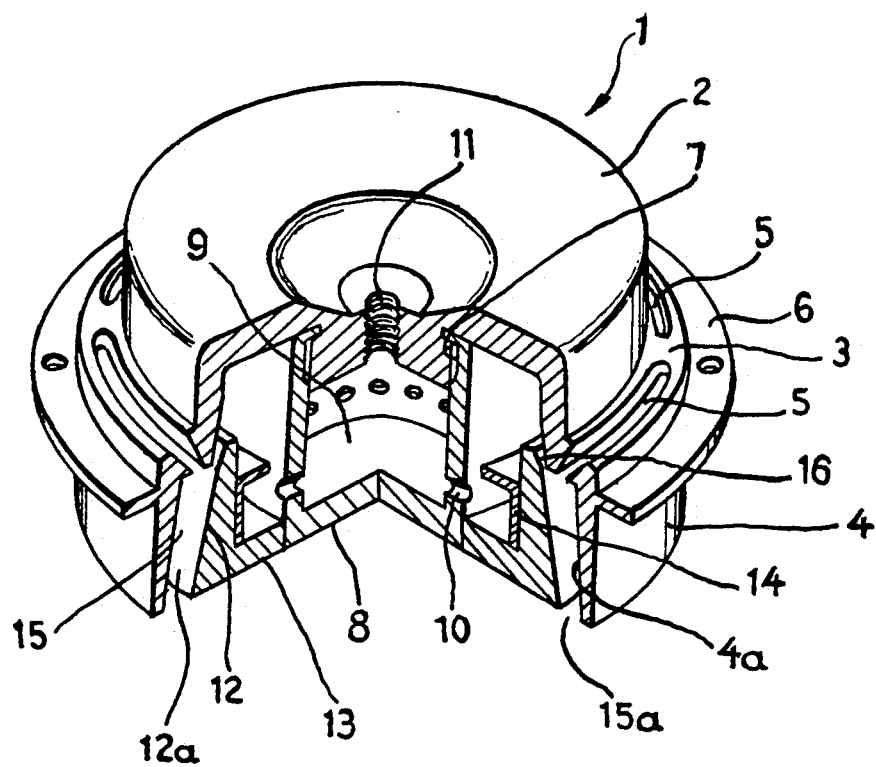
FIG. 3 is a perspective view of the new gas generating apparatus.

Referring now to FIGS. 1-2, a description will be made of an embodiment of the present invention.

As illustrated in FIGS. 1-2, reference numeral 1 denotes a housing body one end of which is choked and the other end opened, which includes a cylinder portion 2 with a small diameter and a cylinder portion 4 with a small diameter connected to an opening end of this cylinder portion 2 by means of a flange portion 3. A multiplicity of air intakes 5 comprising slotted holes arrayed in a ring-like configuration are provided in the flange 3, and an inner circumferential wall surface 4a of the cylinder portion 4 with a large diameter is formed into a tapered face whose greater diameter is at opening end. Reference numeral 6 indicates a flange which is formed integrally with the outer periphery of the large-diameter cylinder portion 4, and an opening of the air bag (not shown but the relative location of which is shown by dotted line B) can be mounted on this flange.

A threaded portion 7 which is concentrically formed at the center of the choked portion inside the housing body 1 is screwed into the cylinder 8 such as to face the opening thereof. This cylinder 8 forms a combustion chamber 9 wherein its entire outer circumferential wall on the closed side is provided with a multiplicity of combustion gas orifices 10. A gas generating agent (not shown) in the form of either granules or pellets, which is composed of an oxidizing agent such as sodium azide and sodium nitrate or potassium perchlorate, is stored in the combustion chamber 9. Reference numeral 11 means for receiving a gas generating agent igniting device mounted at the center of the threaded portion 7.

In FIG. 1, reference numeral 12 denotes a cylindrical partition which is concentrically disposed around the periphery of the cylinder portion 8 inside the large-diameter cylinder portion 4 of the housing body 1 in such a manner as to surround the gas orifices 10. A flange 13 of the cylindrical partition 12 is integrally connected with the outer periphery the cylinder 8 on the choked side thereof by welding, and a filter 14 is provided inside the partition 12 in order to filtrate combustion residues in a gas. Further, the outer circumferential wall surface 12a of the partition 12 is so formed as to have a tapered face which is in parallel with the inner circumferential wall surface 4a of the cylinder portion 4, wherein the inner circumferential wall 4a and outer circumferential wall surface 12a form a mixing chamber 15 for a combustion gas and air which is sucked from the intake 5. A nozzle 16 is formed into a ring-like configuration between the inner circumferential angle portion of the flange portion 3 in close proximity to the air intakes 5 of the housing body 1 and the opening end portion of the cylindrical partition 12 which faces this inner circumferential angle portion, whereby a high-pressure combustion gas is throttled and ejected into the mixing chamber 15 at high speed.

The ratio of the entire sectional area of the air intakes 5 to the sectional area of the throat of the nozle 16 is preferably set at least 10:1 or more and, more preferably, 50:1 or more. The ratio L/D of the length L of the mixing chamber 15 which is formed by the inner circumferential wall surface 4a and the outer circumferential wall surface 12a to the space D between these wall surfaces is set between 1:1 and 1:8, and the ratio of air taken thereinto becomes maximum when it is set between 1:5 and 1:7.

In a gas generating apparatus configured as described above, a high-pressure gas with a pressure of 50 to 200 kg/cm² is produced when the gas generating agent is ignited by the igniting device 11 and combusted in the combustion chamber 9. This high-pressure gas flows from the orifices 10 into the cylider 12 whereas solid residues in the gas is removed when passing through the filter 14, and the gas is ejected from the nozzle 16 into the mixing chamber 15 at high speed. Since the pressure in the opening portion A of the air intake 5 which is open to the mixing chamber 15 is reduced remarkably to less than the atmospheric pressure at this moment, a large quantity of air from the inside of an automobile is sucked in through the air intakes 5. This sucked air is mixed with the mixing chamber 15 with the high-temperature, high-pressure gas ejected from the nozzle 16, whereby the gas is cooled and an air bag, (not shown except by its general location at B) is instantly inflated (within some tens of milliseconds) with the air which is discharged thereinto from an opening 15a of the mixing chamber 15.

It should be noted that the lower the pressure in the combustion chamber 9 is, the larger the ratio of the quantity of sucked air to the quantity of combustion gas becomes. However, since the speed of the entire mixture of gas flowing into the air bag is reduced, resulting in the delay of inflation of the air bag, the pressure in the combustion chamber is preferably set at between 50 and 200 kg/cm² in order that the air bag can be completely inflated in the steering compartment in such a short time as some tens of milliseconds. The ratio of the total sectional area of the air intakes 5 to the total sectional area of the throat of the nozzle 16 is set at least 50:1 or more. Further, the ratio L/D is preferably set between 5:1 and 7:1. Thus, the mixing rate of air becomes high, with the result that cooling of the combustion gas and consequently cooling of the gas generating apparatus itself can be performed effectively. This allows the gas generating apparatus to be reduced in size and weight, since the temperatures of the gas and gas generating apparatus are lower and the quantity of gas generating agent used is reduced. In addition, safety of the apparatus is improved due to the absence of any danger of burns or other hazards.

The pressure inside the automobile can be prevented from rising by virtue of the air bag being inflated in a conventional manner, because the air in the automobile is sucked into the air bag during its expansion. Also, costs can be reduced in proportion to the decrease in the quantity of gas generating agent used.

It is considered that 20 to 30 g of the gas generating agent will fully inflate the air bag, since the gas generating apparatus of the embodiment according to the present invention positively sucks air, whereas a conventional gas generating apparatus requires 70 to 100 g of gas generating agent to inflate an air bag with volume of 60 liters provided for a driver's seat.

It should be noted that a gas generating apparatus according to the present invention is not limited to the one having the asrrangement described in the above embodiment.

In addition, a gas generating apparatus according to the present invention can be applied not only to an air bag for the driver's seat of an automobile but can also be employed as a gas generating apparatus for inflating an air bag for an assistant's seat, life boat, rubber boat, escape chute, etc. where a larger quantity of air is required for inflating.

Thus, in accordance with the present invention, a gas generating apparatus is arranged such that a combustion chamber for a gas generating agent is disposed at the center of a housing body, and air intakes, a nozzle for gas ejection, and a mixing chamber for mixing sucked air and ejected gas are provided on the outer peripheral side of the housing. Therefore, a large quantity of outside air can be positively sucked into the air bag during an operation of the gas generating apparatus and, consequently the quantity of the gas required for inflating the air bag can be sufficiently maintained even if there is an inherently insufficient quantity of the gas generating agent employed for this purpose, thereby, allowing the volume of the combustion chamber to be reduced in parallel with the lower quantity of gas generating agent used. A further effect is that the lower gas temperatures offer an improved level of safety, since the gas and air may flow into the air bag after being mixed with each other.

What is claimed is:

1. A gas generating apparatus for inflating an air bag, comprising:
   a housing body (1) having opposite sides, one of which opens toward an air bag when a portion (6) of the body is connected to such air bag;
   a combustion chamber (9) formed centrally within said housing body, wherein high-pressure gas is generated upon combustion of a gas generating agent contained within the body;
   the housing body having a partition (12) which forms a mixing chamber (15) in ring-like configuration concentrically disposed so as to be spaced apart from a discharge (15a) opening of said housing body by a desired interval, said combustion chamber communicating with said mixing chamber whereby said high-pressure gas from said combustion chamber is introduced into said mixing chamber;

a nozzle (16) of ring-like configuration provided wherein said housing body for ejecting said high-pressure gas flowing from said combustion chamber toward an entrance opening of said mixing chamber formed by said partition; and an air intake means (5) formed in said housing body in close proximity to said nozzle and opening from the side of the housing body opposite from such air bag, whereby said high pressure gas ejected by said nozzle causes air to be drawn through said air intake means into said mixing chamber and mixed therein with said high-pressure combustion gas for cooling thereof.

2. A gas generating apparatus for inflating an air bag according to claim 1, wherein:

said housing body has a cross-section of a substantially U-shaped form with one end opposite from such air bag choked and the other end providing said discharge opening (15 a), comprising a first cylinder portion (2) having a smaller diameter and a further cylinder portion (4) having a larger diameter connected by a flange portion (3) to the opening of said cylinder portion with a small diameter;

said flange portion being provided with a plurality of air intake ports (5) formed by slotted holes constituting said air intake means, said slotted holes being arrayed in a ring-like configuration; and said further cylinder portion having an inner circumferential wall formed with a tapered face of diameter widening toward a direction from said flange portion toward said discharge opening.

3. A gas generating apparatus for inflating an air bag according to claim 2, wherein a flange mount (16) is formed integrally with the outer circumference of said first cylinder portion to allow the opening of such air bag to be mounted on said flange mount.

4. A gas generating apparatus for inflating an air bag according to claim 1, wherein said combustion chamber comprises a further cylinder (8), one end thereof being choked, screwed to a threaded portion (7) concentrically formed at the center of said body housing.

5. A gas generating apparatus for inflating an air bag according to claim 4, wherein said further cylinder (8) comprises a multiplicity of combustion gas orifices provided around the entire circumference of a circumferential wall at said choked end (8) of said further cylinder.

6. A gas generating apparatus for inflating an air bag according to claim 2, wherein said partition (12) is located within said further cylinder portion (4) and is concentrically disposed at the outer periphery of said further cylinder (4) in such a manner as to surround said combustion gas orifices.

7. A gas generating apparatus for inflating an air bag according to claim 6, wherein said partition (12) is integral with a flange projection (13) and is welded by means of the flange projection to the choked end of said further cylinder (8).

8. A gas generating apparatus for inflating an air bag according to claim 1, further comprising a filter (14) for the filtration of combustion residues in said combustion gas, said filter being provided within said partition (12).

9. A gas generating apparatus for inflating an air bag according to claim 2, wherein said partition has an outer circumferential wall (12a) having a tapered face which is in parallel with an inner circumferential wall of said further cylinder portion (4) of said housing body.

10. A gas generating apparatus for inflating an air bag according to claim 2, wherein said combustion chamber is formed so as to mix said combustion gas with air sucked from said air intake means between inner circumferential wall of said further cylinder portion (4) and an outer circumferential wall of said partition (12).

11. A gas generating apparatus for inflating an air bag according to claim 2 wherein said nozzle (16) is formed between an inner circumferential angle portion of said flange portion (3) in close proximity to said air intake means (5), whereby said combustion gas is throttled to eject toward said mixing chamber at high speed.

12. A gas generating apparatus for inflating an air bag according to claim 1, said nozzle (16) having a throat, wherein the ratio of the sectional area of said air intake means to the sectional area of said throat is at least 10:1.

13. A gas generating apparatus for inflating an air bag according to claim 12, wherein the ratio of the total sectional area of said air intake means to the sectional area of said nozzle throat is at least 50:1.

14. A gas generating apparatus for inflating an air bag according to claim 1, wherein the ratio L/D of a length L formed by inner circumferential and outer circumferential walls of said mixing chamber to an interval D between said walls is between 1:1 and 8:1.

15. A gas generating apparatus for inflating an air bag according to claim 14, wherein said ration L/D is between 5:1 and 7:1.

* * * * *

UNITED STATES PATENT AND TRADEMARK OFFICE
CERTIFICATE OF CORRECTION

PATENT NO. : 5,004,586
DATED : April 2, 1991
INVENTOR(S) : M. Hayashi et al

It is certified that error appears in the above-identified patent and that said Letters Patent is hereby corrected as shown below:

Col. 5, line 6, replace "wherein" with --within--;

line 39, replace "(16)" with --(6)--.

Signed and Sealed this

Twenty-fifth Day of August, 1992

Attest:

DOUGLAS B. COMER

*Attesting Officer*   *Acting Commissioner of Patents and Trademarks*